United States Patent
Vignali (10) Patent No.: US 12,054,265 B2
(45) Date of Patent: Aug. 6, 2024

(54) ELECTRIC MOTOR DRIVEN AIR CYCLE ENVIRONMENTAL CONTROL SYSTEM

(71) Applicant: Hamilton Sundstrand Corporation, Charlotte, NC (US)

(72) Inventor: Mark G. Vignali, Simsbury, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 17/701,839

(22) Filed: Mar. 23, 2022

(65) Prior Publication Data
US 2023/0303252 A1 Sep. 28, 2023

(51) Int. Cl.
B64D 13/06 (2006.01)
B64D 13/08 (2006.01)

(52) U.S. Cl.
CPC .......... B64D 13/06 (2013.01); B64D 13/08 (2013.01); B64D 2013/0618 (2013.01); B64D 2013/064 (2013.01); B64D 2013/0644 (2013.01)

(58) Field of Classification Search
CPC B64D 13/06; B64D 13/08; B64D 2013/0618; B64D 2013/064; B64D 13/02; B64D 13/006; B64D 2013/0688; B64D 2013/0611; B64D 2013/0644; B64D 2013/0655; B64D 2221/00; B64D 33/02; B64D 33/04; F02C 6/08
See application file for complete search history.

(56) References Cited

U.S. PATENT DOCUMENTS

| | | | | |
|---|---|---|---|---|
| 4,684,081 A | * | 8/1987 | Cronin | B64D 13/06 244/53 A |
| 4,840,036 A | * | 6/1989 | Spraker, Jr. | F24F 3/04 62/402 |
| 5,461,882 A | * | 10/1995 | Zywiak | B64D 13/06 62/401 |
| 5,911,388 A | * | 6/1999 | Severson | B64D 13/06 62/401 |
| 6,427,471 B1 | | 8/2002 | Ando et al. | |
| 10,429,107 B2 | | 10/2019 | Ludvik et al. | |
| 10,457,399 B2 | * | 10/2019 | Bammann | B64D 13/06 |
| 11,014,677 B2 | | 5/2021 | Defrancesco et al. | |
| 2006/0117956 A1 | | 6/2006 | Schwalm | |
| 2014/0331857 A1 | | 11/2014 | Massey et al. | |
| 2017/0129614 A1 | | 5/2017 | Bammann et al. | |
| 2017/0275004 A1 | | 9/2017 | Bammann et al. | |

(Continued)

FOREIGN PATENT DOCUMENTS

EP 3875371 A1 * 9/2021 ............. B64D 13/06

OTHER PUBLICATIONS

European Search Report for Application No. 23162414.9, mailed Aug. 17, 2023, 8 pages.

*Primary Examiner* — Gordon A Jones
(74) *Attorney, Agent, or Firm* — CANTOR COLBURN LLP (57) ABSTRACT

An environmental control system of an aircraft includes a ram air input configured to receive ram air from a ram air duct of the aircraft and an electric motor driven compressor system. The system also includes a RAM heat exchanger and an ejector connected to the output of the RAM heat exchanger that is fluidly connected to the output of a compressor in the compressor system and that causes ram air received at the cooling flow input to be drawn through the RAM heat exchanger.

8 Claims, 4 Drawing Sheets

(56) References Cited

U.S. PATENT DOCUMENTS

2018/0281977 A1* 10/2018 DeFrancesco ........ F04D 25/045
2019/0002109 A1*  1/2019 Bruno ................... B64D 13/08
2019/0135440 A1*  5/2019 Bruno ................... B64D 13/06
2019/0389587 A1* 12/2019 Bruno ................... B64D 13/08

* cited by examiner

ELECTRIC MOTOR DRIVEN AIR CYCLE ENVIRONMENTAL CONTROL SYSTEM

BACKGROUND

Exemplary embodiments pertain to the art of aircraft environmental control systems and, in particular, to an electric motor driven aircraft environmental control system.

In general, with respect to present air conditioning systems of aircraft, cabin pressurization and cooling is powered by engine bleed pressures at cruise. For example, pressurized air from an engine of the aircraft is provided to a cabin through a series of systems that alter the temperatures and pressures of the pressurized air. To power this preparation of the pressurized air, the only source of energy is the pressure of the air itself. As a result, the present air conditioning systems have always required relatively high pressures at cruise. Unfortunately, in view of an overarching trend in the aerospace industry towards more efficient aircraft, the relatively high pressures provide limited efficiency with respect to engine fuel burn.

One approach to make the aircraft more efficient is to a more electric environmental control system (ECS). In such systems, the ECS can include a motor that drives a compressor and operates with ambient (e.g., RAM) air. In such ECSs a maximum power condition is required for delivering air to a cabin of an aircraft during a maximum cruise altitude of the aircraft. At the maximum cruise altitude, a pressure ratio of a compressor of the CECS is dictated by a need to increase a pressure from ambient (e.g., approximately 3 psia at this condition) to a value high enough to pressurize the cabin, overcome pressure losses regarding compression heat, transport the air to the cabin, and (in the case of an air cycle ECS) create refrigeration on hot day conditions.

BRIEF DESCRIPTION

Disclosed is an environmental control system of an aircraft. The system includes a ram air input configured to receive ram air from a ram air duct of the aircraft and an electric motor driven compressor system. The compressor system includes that includes: a shaft, a compressor connected to the shaft, wherein the compressor has in input fluidly connected to the ram air input and a compressor output, an electric motor connected to the shaft and configured to drive the compressor, and a regeneration turbine connected to shaft and also configured to drive the compressor upon receipt of outflow air received at least partially from an output of a cabin of the aircraft, the regeneration turbine including a regeneration turbine input and a regeneration turbine output. The system also includes a RAM heat exchanger having: a heated flow input connected to the output of the compressor and that receives compressed air form the compressor; a cooling flow input connected to the ram air input that receives ram air; an output that discharges the ram air overboard. The RAM heat exchanger is arranged and configured such that ram air received at the colling flow input cools compressed air received at the heat flow input received from the output of the compressor; The system also includes a regeneration heat exchanger fluidly connected to RAM heat exchanger, the regeneration heat exchanger having: an input that receives air from the regeneration turbine output and cools air received from the compressor after it has passed through the RAM heat exchanger; a compressed air output configured to provide air to the cabin; and an ejector connected to the output of the RAM heat exchanger that is fluidly connected to the output of the compressor and causes ram air received at the cooling flow input to be drawn through the RAM heat exchanger.

In addition to one or more of the features described above, or as an alternative to any of the foregoing embodiments, the system can further include an ejector supply valve connected between the heated flow input and a high-pressure inlet of the ejector that controls flow of the compressed air A' to the high-pressure inlet.

In addition to one or more of the features described above, or as an alternative to any of the foregoing embodiments, the ejector supply valve can be configured to be closed during flight of the aircraft.

In addition to one or more of the features described above, or as an alternative to any of the foregoing embodiments, the ejector supply valve can be configured to be open when the aircraft is on the ground.

In addition to one or more of the features described above, or as an alternative to any of the foregoing embodiments, the system can further include a bypass turbine connected to the shaft, the bypass turbine including an input fluidly connected to the compressed air output and an output.

In addition to one or more of the features described above, or as an alternative to any of the foregoing embodiments, the system can further include a bypass valve connected between the input bypass turbine and the output of the bypass turbine.

In addition to one or more of the features described above, or as an alternative to any of the foregoing embodiments, during flight the bypass valve is configured to direct compressed air from the compressed air output around the bypass turbine.

In addition to one or more of the features described above, or as an alternative to any of the foregoing embodiments, the system can further include a cabin bypass valve connected between an input and output of the cabin.

Also disclosed is method of controlling an environmental control system as disclosed in any prior embodiment . . . . The method can include with controller, causing the system to operate in a first mode by opening an ejector supply valve connected between the heated flow input and a high-pressure inlet of the ejector so that the ejector supply valve allows flow of the compressed air A' to the high-pressure inlet while the aircraft is on the ground; and with the controller, causing the system to operate in a second mode by closing the ejector supply valve while the aircraft is flying above a predetermined airspeed.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

As discussed above, in some cases more electric ECSs can include a motor that drives a compressor. However, such alternative electric architectures are very complex and include a large number of components. Further, the typical single stage electric compressors cannot produce adequate pressure to drive an air cycle machine in the ECS at extreme altitudes (e.g., above 60,000 ft). Herein disclosed is a system that work with only RAM in one embodiment and can operate at extreme altitudes and the associated high air speeds.

In general, one embodiment can include a motor driven 3-wheel air cycle machine (ACM), 2 heat exchangers, an ejector to generate RAM airflow through the first heat exchanger when on the on the ground, and control valves to configure the systems in at least two difference configurations based on the ground/flight status. In operation, RAM air is compressed and cooled through the RAM heat exchanger. The ejector uses a small portion of compressor outlet air to generate RAM airflow through the RAM heat exchange while the aircraft is on the ground. In one embodiment, while on the ground, the second heat exchanger uses cold pack outlet air and acts as a condenser. In flight the second heat exchanger uses cabin outflow air that has been expanded and cooled through a turbine. The cooled high pressure air is expanded through a turbine and supplied to the cabin.

In one embodiment, the system disclosed herein may provide pressurization and temperature control with a single rotating component (e.g., shaft) and no bleed air usage. In one embodiment, the compressor is driven at least partially with an electric motor. The electric motor can be supplement with one or two turbines connect to a shaft that electric motor uses to drive the compressor. By providing the turbines, the requirements of the motor can be supplement when it cannot generate enough power or allow for the motor to use less power, or both.

In one embodiment, outflow air is first expanded and then used to cool the input air. This can provide power to the compressor and thus, reduce electric power consumption and also reduce the required ram flow in flight which can, in turn, reduce aircraft drag. Expanding outflow air may allow the disclosed system to function efficiently at 60,000 ft as turbine cooling is accomplished after cabin pressurization in some embodiment. Further, the regeneration flow (e.g. the regeneration turbine T2 herein) may provide an alternative heat sink when cabin outflow is not available in some embodiments.

The above discussion will become more apparent based on the following discussions.

Figure 1:
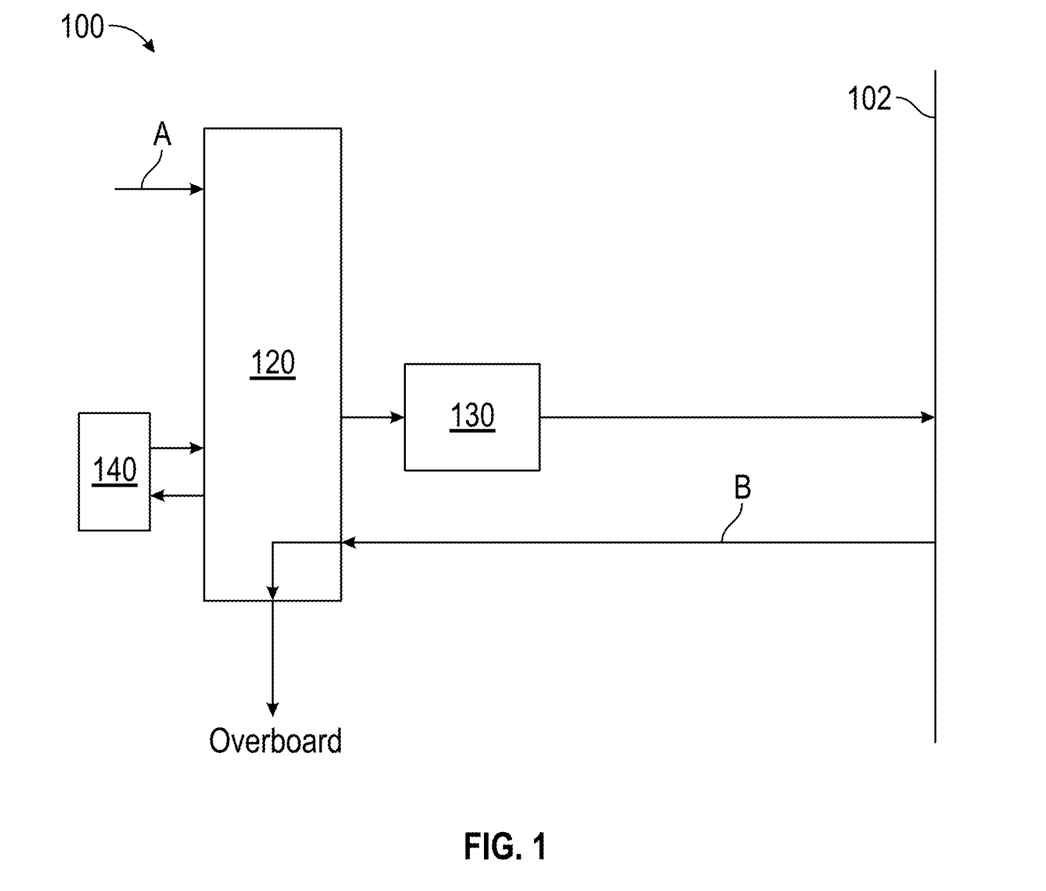
FIG. 1 is a block diagram showing an environmental control system according to one embodiment.

Turning now to FIG. 1, a diagram of a schematic of an environmental control system 100 is depicted according to one or more embodiments. The environmental control system (ECS) 100 provides pressurized and temperature-controlled air to a volume 102 such as an aircraft cabin. The ECS 100 can include, generally, a motor-driven compressor assembly 120 and an air conditioning pack 130.

The environmental control system 100 is an example of an environmental control system operates only with RAM air and, thus, does not bleed air from the engine. This may be useful, for example, in an all or partially electric aircraft. The RAM air is both conditioned in the system 100 so that it can be used to provide cabin pressurization and cooling at high electric efficiency (e.g., provide a pressurized medium to the volume 102) as well as used to drive the system 100.

The elements of the environmental control system 100 are connected via valves, tubes, pipes, and the like. Valves (e.g., flow regulation device or mass flow valve) are devices that regulate, direct, and/or control a flow of a medium by opening, closing, or partially obstructing various passageways within the tubes, pipes, etc. of the environmental control system 100. Valves can be operated by actuators, such that flow rates of the medium in any portion of the environmental control system 100 can be regulated to a desired value.

The schematic of the environmental control system 100 is depicted according to a non-limiting embodiment, as it could be installed on an aircraft. The aircraft example is not intended to be limiting, as alternative embodiments are contemplated In view of the above aircraft embodiment, a first medium can be RAM air (e.g., arrow A), which can be outside air destined to enter the volume 102. The outside air can be procured by one or more scooping mechanisms, such as an impact scoop or a flush scoop. These scooping mechanisms can be considered fresh air or outside air inlets. Generally, the fresh air described herein is at an ambient pressure outside of the aircraft with respect to altitude.

A second medium can be procured from the volume 102 (e.g., arrow B). That is, the second medium B can be cabin discharge air, which can be air leaving the volume 102. Herein, this air can be called outflow air and is returned to the compressor assembly 120 and then dumped/discharged overboard. As will be seen from the below description, in one or more embodiments, the outflow air B can be expanded in an optional outflow turbine. This outflow or regeneration turbine (T2 below) can help drive the compressor and, thus, reduce the electricity/power consumed by the motor that drives the compressor. In the below discussion, the volume 102 is shown as cabin 102 and includes the air-conditioning pack 130.

The operation of the air-conditioning pack 130 can be as in the prior art in some embodiment and is not specifically described herein in detail. This pack 130, generally, adjust air received from the motor-driven compressor assembly 120 to a desired level before it is provided to the cabin. Embodiments herein are directedly solely to the motor-driven compressor assembly 120 and, thus, can exclude the air-conditioning pack 130. However, combinations that include the air-conditioning pack 130 and the motor-driven compressor assembly 120 are also within the scope of this disclosure.

The motor-driven compressor assembly 120 can include an electrically driven air cycle machine. In one embodiment, the motor-driven compressor assembly 120 is three-wheel air cycle machine an electric motor that drives a compressor (C), a first or bypass turbine (T1) and a regeneration turbine (T2). The motor-driven compressor assembly 120 can optionally include water extractors, condensers, etc., either located without or outside thereof. The motor-driven compressor assembly 120 can also communicate air with heat exchangers 140.

Figure 2:
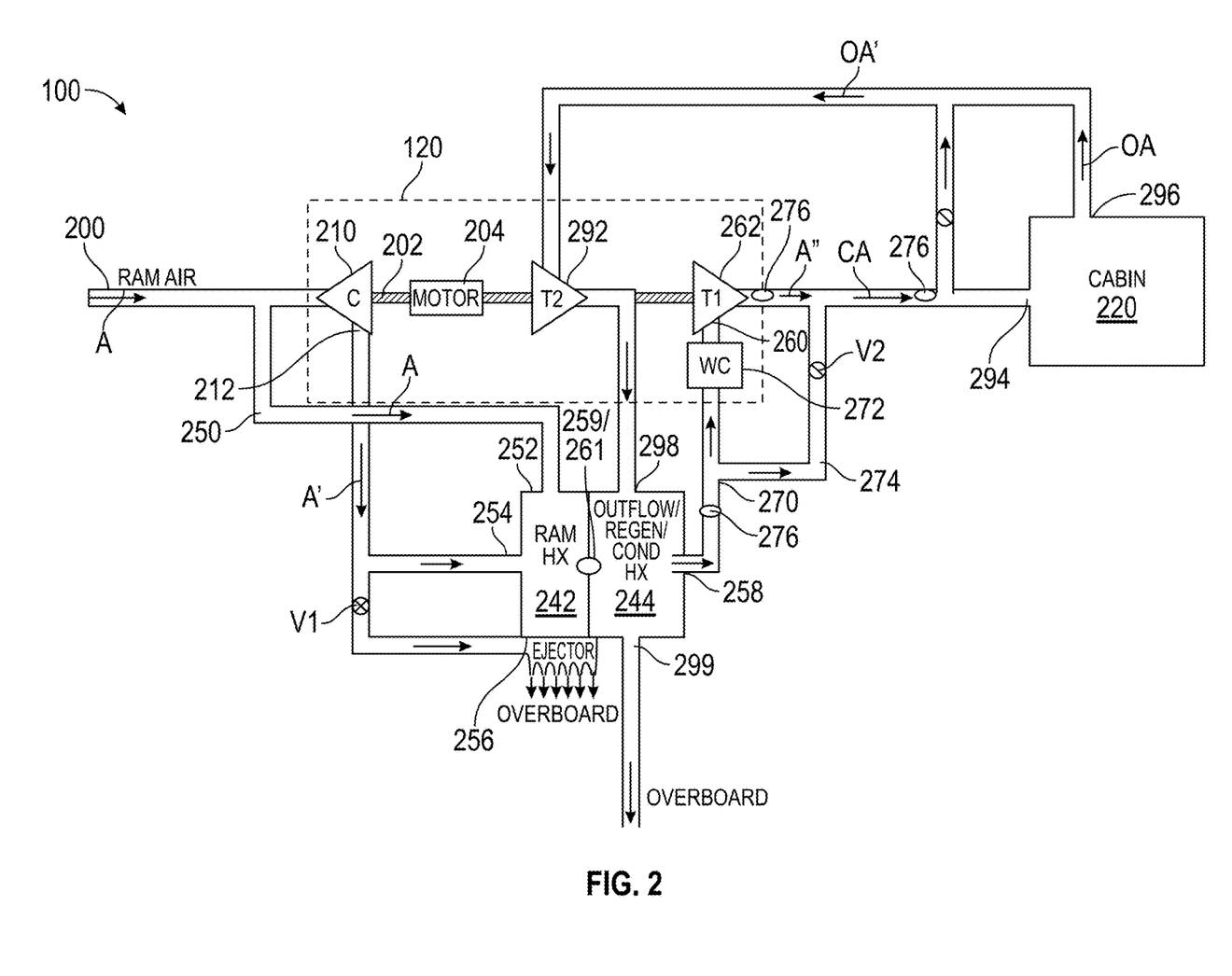
FIG. 2 shows an environmental control system according to one embodiment while in an in-flight operational mode.
Figure 3:
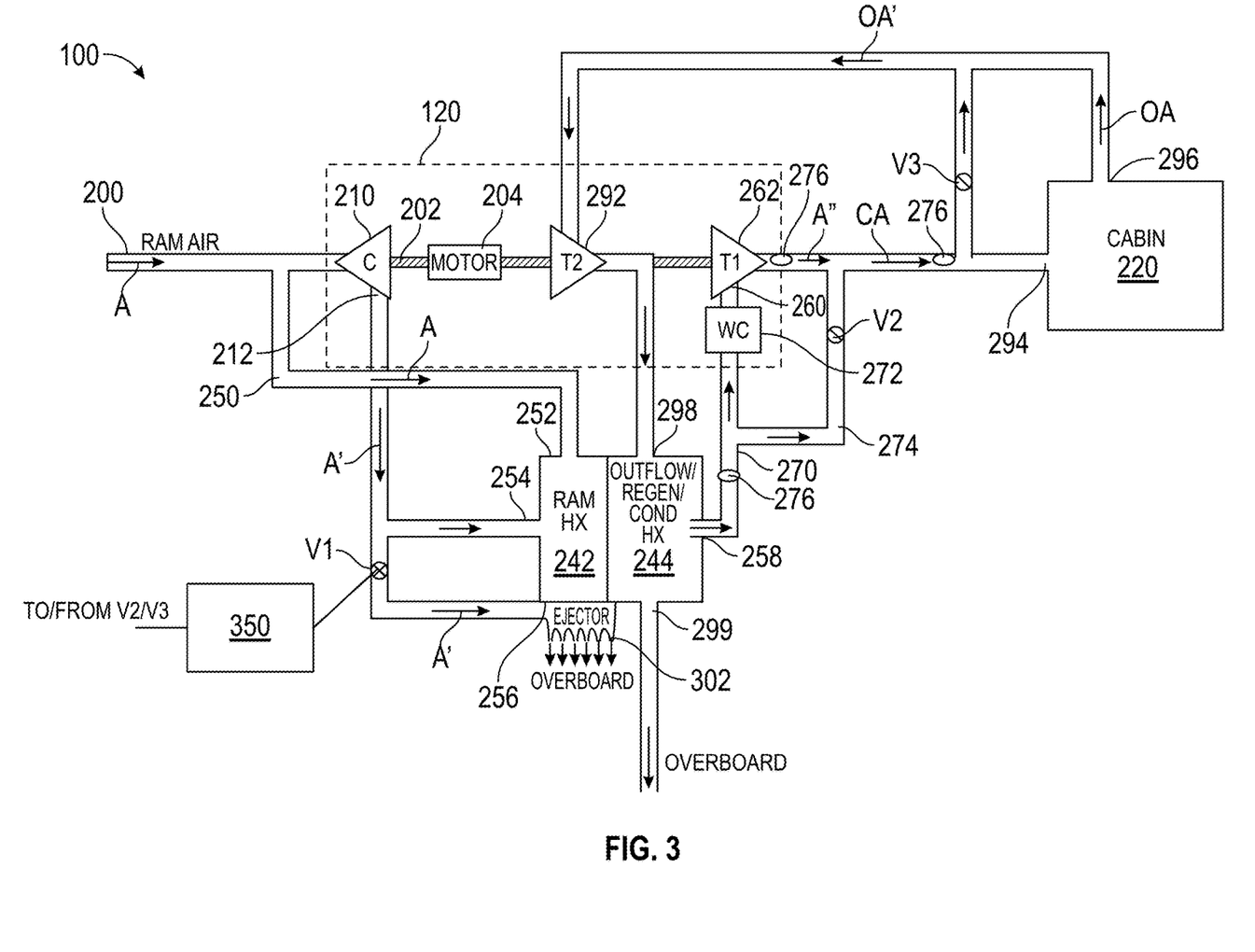
FIG. 3 shows an environmental control system according to one embodiment while in a ground operational mode.

A more detailed version of the connections between motor-driven compressor assembly 120, the cabin 102 and the heat exchangers 140 is shown and described in FIGS. 2 and 3. FIG. 2 will be shown with airflow paths that will exist while in flight. FIG. 3 will be shown with airflow paths that will exist while in the aircraft is on or near the ground. These paths can be configured by at least a first valve V1 as well as other valves such as valves V2 and V3. The following description has certain pressures and temperatures listed. It shall be understood that such pressures/temperatures are for explanation only and do not limit the operation of the embodiment disclosed herein. The valve V1 can be referred to as ejector supply valve.

The motor-driven compressor assembly 120 includes a compressor C, and a shaft 202. The shaft 202 is connected to an electric motor 204 that drives the compressor C. The motor 204 can receive power from a power source such as generator or a power bus (e.g., a power bus of an aircraft).

The motor-driven compressor assembly 120 also includes first and second turbines T1/T2 both connected to the shaft 202. Turbine T2 can be referred as the regeneration or outflow turbine herein from time to time.

The configuration with the motor 204 and the first and second turbines T1/T2 connected to the shaft 202 allows for any or all of them to drive the compressor C.

In one embodiment, the compressor C receives RAM air via a RAM air inlet 200. During flight, at high altitude, the outside air is at about 1 psi but due to RAM pressure rise the RAM air A is at about 3 psi. The compressor includes a compressor input 210 fluidly coupled to the air inlet 200.

A typical compressor C connected as shown in FIG. 2 can have a pressure ratio of 4 to 5. That is, the pressure at an output 212 of the compressor is about 4 to 5 times the pressure at the input 210. Thus, in this given example, at high altitude flight the pressure of the air (A') at the output 212 of the compressor C would be between 12 and 15 psi. Such a pressure is not, however, high enough to drive a traditional aircraft ECS air cycle system. Typically, the pressure should at least over about 20 psi.

Thus, in embodiments herein, a motor 204 is added to provide extra power to drive the shaft 202 and achieve the desired pressure of the air A' at the output of the compressor C.

The air A' at the output of the compressor C is then provided through a conduit 240 to a first (or RAM) heat exchanger 242. The system also includes a second (or outflow or regeneration) heat exchanger 244. These heat exchangers 242, 244 are shown as co-located in FIGS. 2 and 3 but this is not required. In one embodiment, the heat exchangers 242, 244 are contained in a single unit.

It shall be understood that compressed air A' is at a significantly higher pressure and temperature as compared to the input air A. As such, the input A can be used to cool the compressed air A' in the RAM heat exchanger 242. To that end, a bypass conduit 250 in connected between input 200 and a cooling flow input 252 of the RAM heat exchanger 242. The bypass conduit 250 is provided between the inlet 200 and the input to the compressor C.

The output 212 of the compressor C is connected to heated flow input 254 of the RAM heat exchanger 242 so that RAM heat exchanger 242 can utilize the air A to cool compressed (and higher temperature relative to air A) air A'. The skilled artisan will realize that the RAM heat exchanger 242 (as well as outflow/regeneration heat exchanger 244) can be any type of heater exchanger that achieves the desired result of cooling compressed air A'. For example, the exchangers 242, 244 can be cross-flow heat exchanger. In this case, the RAM heat exchanger 242 and the outflow/regeneration heat exchanger 244 can include one fluid to be cooled (A') receiving at input 254 and have two cooling fluids that cool A'. Here the fluids are RAM air A and the output of the second turbine T2. For simplicity, there is no connection shown that provides the transfer compressed air A' from the RAM heat exchanger 242 and the outflow/regeneration heat exchanger 244. As such, the unit comprising RAM heat exchanger 242 and the outflow/regeneration heat exchanger 244 includes input 254 and compressed air output 258 that is part of outflow/regeneration heat exchanger.

For simplicity, however, the RAM exchanger 242 is shown as having a compressed air output 259 that provides air to an input 261 of the outflow/regeneration heat exchanger 244 and, thus, is fluidly coupled to the output 258 and the cabin 220 (and optionally, T1). It shall be understood that the input/output 259/261 need not be physical object and can be formed such the path from the input 254 to the output 258 is a continuous path that is cooled by both air A and air output from T2 as will be understood based on the below description.

The air provided at the cooling flow input 252 passes through the cooling flow input 252 and exits the RAM heat exchanger 242 at RAM heat exchanger exit 256 which discharges the air overboard (e.g., at ambient pressure of 1 psi). During flight, the pressure of air at the cooling flow input 252 of the RAM heat exchanger 242 is slightly above the ambient (e.g., 3 psi) due to RAM pressure rise. Thus, the pressure differential is sufficient to have flow between the inlet 252 and the outlet 256 during flight. This allows V1 to remain closed during flight. As explained below, when on the ground, V1 may be opened to help ensure input air A flows across the RAM heat exchanger 242 from the inlet 252 to the outlet 256

During flight, and on the ground, the compressed air A' is thus cooled in the RAM heat exchanger 242 and then provided to a regeneration heat exchanger 244. The regeneration heat exchanger 244 include an output 258. The output 258 can be fluidly connected to the cabin 220 either directly via valve V2, through the first turbine T1 or both depending on the open/closed status of valve V2.

Valve V2 is connected between the output 258 and the cabin 220 and can be referred to as bypass or T1 (first turbine) bypass valve herein. During flight the T1 bypass valve V2 may modulate such that T1 is completely or partially bypassed. In the even the pressure of the compressed air above what is needed to be provide to the cabin 220 the T1 bypass valve can be partially or completely closed so that some or all of the compressed air is provided first turbine T1. This will allow for the air A' to be expanded in the first turbine T1 to reduce its pressure and temperature.

The input 260 of the first turbine T1 is connected via first turbine connection conduit 270 to the output 258 of the outflow/regeneration heat exchanger 244. The connection can be direct or one more optional elements such as an optional water collector 272 can be disposed between the input 260 of the first turbine and the output 258 of the outflow/regeneration heat exchanger 244.

A turbine bypass conduit 274 is provided between the input 260 and the output 262 so that air can bypass (ether partially or totally) the first turbine T1. THe T1 bypass valve V2 is disposed in the bypass conduit 274. During flight this valve can be fully opened in one embodiment when the pressure of the compressed air A' is below an upper threshold. If the pressure of air A' is too high or the temperature is too high (or both), the pressure and temperature of the A' can be reduced by partially or fully closing the bypass valve V2 so some of A' directed to and expanded in T1 to produce stream A". Air A' and A" are combined to produce cabin air CA. As will be understood, in case where V2 is fully closed, CA will be formed completely of A" and can be totally or almost totally composed of air A' when V2 is fully open.

To determine how to operate V2, one or more sensors 276 can be provided that measure one of temperature, pressure or both. The locations of the sensors 280 are by way of example and could be moved and the number is not fixed and could be as few as one (e.g., that measure CA). As shown, the sensors 276 are at the output 258 of the regeneration heat exchanger 244, the output 262 of the first turbine T1 and a location where CA has been formed.

While in flight, a cabin bypass valve V3 can be closed such that CA is directed into the cabin 220. Some or all of the cabin air CA can be returned to the systems as outflow air OA. A (possibly) modified version out the outflow air OA can then be created. That version is labelled as OA'. When the cabin bypass valve V3 is closed, OA and OA' are the same. However, if the cabin bypass valve V3 is open, OA' can be combination of OA and cabin air CA.

OA' is then provided to the outflow turbine T2. In particular, OA' is provided to an input 290 of the outflow turbine T2 via an outflow conduit 292. The outflow conduit 292 is fluidly connected to both the cabin air input 294 (through valve V3) and the cabin air output 296. OA' is then expanded in bypass turbine T2. The expansion will generate power to drive the compressor C and cool the OA'. Thus, the cooled OA' can then be provided to an input 298 of the outflow heat exchanger 244 and be used to cool the compressed air A' and then dumped overboard via output 299.

In the prior explanation, V1 and V3 where generally in the closed position during flight and the open/closed state of V2 could be varied.

When on the ground, V1 is opened, the open/closed state of V3 could be varied, and the open/closed state of V2 could be varied. Typically, V3 will be opened and V2 will be closed.

As shown in FIG. 3, the opening of valve V1 will result in at least some compressed air A' being directed to the output 256 of the RAM heat exchanger 256. An ejector 302 is arranged at the output 256 of the RAM heat exchanger 256. The ejector supply valve V1 controls flow of the compressed air A' to an input of the ejector 302.

Figure 4:
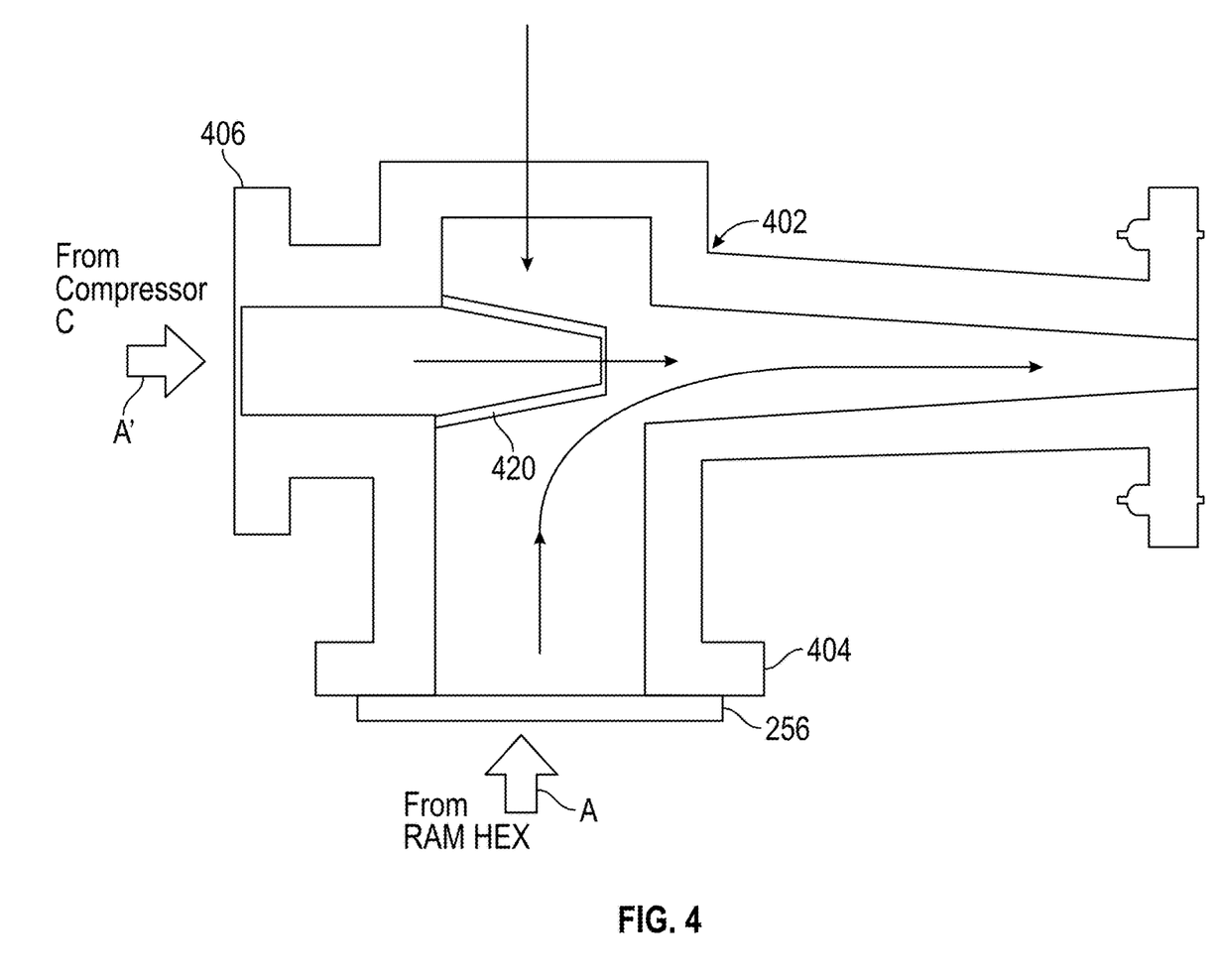
FIG. 4 shows an example ejector that can be utilized on the output of the RAM heat exchanger shown in FIGS. 2 and 3.

With reference now to FIG. 4, an ejector is a type of vacuum pump, which produces vacuum by means of the Venturi effect. In an ejector such as ejector 402, a working fluid flows through a jet nozzle into a tube that first narrows and then expands in cross-sectional area. This at the location of narrowing, a low-pressure region 404 is created which draws in a low-pressure gas. As discussed above, there is not a pressure drop between the RAM air A and ambient air, because the aircraft is either not moving at all or moving slowly (relative to speed during flight).

With reference to both FIGS. 3 and 4, the RAM heat exchanger outlet 256 can be connected to a low pressure inlet 404 of the ejector 402. The high pressure inlet 406 can be connected to the output 212 of the compressor C though valve V1 (see FIG. 3). In this case, the working fluid is A' and flow through jet nozzle 420. This causes air A from the RAM HEX outlet 256 to be drawn into ejector and, thus, causes cooling flow of air A to pass from the inlet 252 of the RAM HEX to the RAM HEX outlet 256 (e.g., to ambient) even when there is no pressure differential (or only a small differential) between the inlet 200 and ambient.

The position of the ejector supply valve V1 (as well as V2 and V3) can be controlled by a controller 350. The skilled artisan will realize that the controller can be any type of controlled and allows the system 100 to be operated in at least two modes. The first mode is flight mode where V1 is closed and the aircraft is airborne and, in one embodiment, at a cruising altitude. The cruising altitude can be above 20,000 ft in one embodiment. In one embodiment, the cruising altitude is a high altitude cruising altitude that is above 50,000 ft.

The controller 350 can make these decisions, in one embodiment, based on the altitude of the aircraft and/or the pressure and temperature made by the sensors 276. In one embodiment, rather than or in addition to altitude, the controller can make the above decisions based on airspeed of the aircraft.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An environmental control system of an aircraft comprising:
   a ram air input configured to receive ram air from a ram air duct of the aircraft;
   an electric motor driven compressor system that includes:
      a shaft;
      a compressor connected to the shaft, wherein the compressor has in input fluidly connected to the ram air input and a compressor output;
      an electric motor connected to the shaft and configured to drive the compressor; and
      a regeneration turbine connected to shaft and also configured to drive the compressor upon receipt of outflow air received at least partially from an output of a cabin of the aircraft, the regeneration turbine including a regeneration turbine input and a regeneration turbine output;
   a RAM heat exchanger having:
      a heated flow input connected to the output of the compressor and that receives compressed air form the compressor;
      a cooling flow input connected to the ram air input that receives ram air; and
      an output that discharges the ram air overboard;
      wherein the RAM heat exchanger is arranged and configured such that ram air received at the colling flow input cools compressed air received at the heat flow input received from the output of the compressor;
   a regeneration heat exchanger fluidly connected to RAM heat exchanger, the regeneration heat exchanger having:

an input that receives air from the regeneration turbine output and cools air received from the compressor after the air has passed through the RAM heat exchanger; and a compressed air output configured to provide air to the cabin; and an ejector connected to the output of the RAM heat exchanger that is fluidly connected to the output of the compressor and causes ram air received at the cooling flow input to be drawn through the RAM heat exchanger.

2. The environmental control system of claim 1, further comprising an ejector supply valve connected between the heated flow input and a high-pressure inlet of the ejector that controls flow of the compressed air A' to the high-pressure inlet.

3. The environmental control system of claim 2, wherein the ejector supply valve is configured to be closed during flight of the aircraft.

4. The environmental control system of claim 3, wherein the ejector supply valve is configured to be open when the aircraft is on the ground.

5. The environmental control system of claim 1, further comprising:

a bypass turbine connected to the shaft, the bypass turbine including an input fluidly connected to the compressed air output and an output.

6. The environmental control system of claim 5, further comprising:

a bypass valve connected between the input bypass turbine and the output of the bypass turbine.

7. The environmental control system of claim 6, wherein during flight the bypass valve is configured to direct compressed air from the compressed air output around the bypass turbine.

8. The environment control system of claim 7, further comprising a cabin bypass valve connected between an input and output of the cabin.

* * * * *